(12) United States Patent
Hackett et al.

(10) Patent No.: US 9,336,031 B2
(45) Date of Patent: May 10, 2016

(54) MANAGING ALLOCATION OF HARDWARE RESOURCES IN A VIRTUALIZED ENVIRONMENT

(71) Applicant: International Business Machines Corporation, Armonk, NY (US)

(72) Inventors: Joseph E. Hackett, Fort Worth, TX (US); Michael S. Jones, Coppell, TX (US); Andrew D. Rice, Irving, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 400 days.

(21) Appl. No.: 13/778,422

(22) Filed: Feb. 27, 2013

(65) Prior Publication Data

US 2014/0245297 A1     Aug. 28, 2014

(51) Int. Cl.
*G06F 9/455*     (2006.01)
*G06F 9/50*      (2006.01)

(52) U.S. Cl.
CPC .......... *G06F 9/45533* (2013.01); *G06F 9/5077* (2013.01); *G06F 2009/45583* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| 8,145,871 | B2 | 3/2012 | Pafumi et al. | |
| 8,615,589 | B1* | 12/2013 | Adogla | G06F 9/5077 709/226 |
| 2006/0143617 | A1 | 6/2006 | Knauerhase et al. | |
| 2009/0307457 | A1* | 12/2009 | Pafumi et al. | 711/173 |
| 2011/0055399 | A1 | 3/2011 | Tung et al. | |
| 2012/0167083 | A1* | 6/2012 | Suit | 718/1 |
| 2012/0185851 | A1* | 7/2012 | Zhang et al. | 718/1 |
| 2013/0024455 | A1* | 1/2013 | Bose et al. | 707/740 |
| 2013/0290595 | A1* | 10/2013 | Weissman | G06F 17/30 711/6 |
| 2014/0215172 | A1* | 7/2014 | Tsirkin | 711/162 |

OTHER PUBLICATIONS

Xiao, Z.; Song, W.; Chen, Q., "Dynamic Resource Allocation using Virtual Machines for Cloud Computing Environment" (2012), pp. 1-11 [retrieved from http://zhenxiao.com/papers/tpds2012.pdf].*
Xiao, Z.; Song, W.; Chen, Q., "Supplementary File: Dynamic Resource Allocation using Virtual Machines for Cloud Computing Environment" (2012), pp. 1-11 [retrieved from bbs.chinacloud.cn/attachment.aspx?attachmentid=4973].*

(Continued)

*Primary Examiner* — Brian W Wathen
(74) *Attorney, Agent, or Firm* — Cuenot, Forsythe & Kim, LLC (57) ABSTRACT

Hardware resources in a virtualized environment are managed. Via at least one processor external to a physical host that hosts a plurality of virtual machines, resource statistics are received pertaining to hardware resources of the physical host that are allocated to each of the plurality of virtual machines. External to the physical host and in real time, the resource statistics are analyzed to determine whether allocation of the hardware resources to each of the plurality of virtual machines is optimized. When the allocation of the hardware resources to at least one of the virtual machines is not optimized, in real time, at least one resource allocation message is communicated to the physical host, the resource allocation message indicating at least one hardware resource that is to be allocated to, or de-allocated from, the at least one virtual machine.

20 Claims, 5 Drawing Sheets

(56) References Cited

OTHER PUBLICATIONS

Zhao, W.; Wang, Z.; Luo, Y., "Dynamic Memory Balancing for Virtual Machines" (Jul. 2009), ACM SIGOPS Operating Systems Review, vol. 43, Issue 3, pp. 37-47 [retrieved from http://dl.acm.org/citation.cfm?id=1618530].*

Pawar, C.; Wagh, R., "Priority Based Dynamic Resource Allocation in Cloud Computing" (Dec. 17-18, 2012) International Symposium on Colud and Services Computing (ISCOS), pp. 1-6 [retrieved from http://ieeexplore.ieee.org/stamp/stamp.jsp?tp=&arnumber=6481227].*

Rao, J.; Bu, X.; Xu, C.; Wang, K., "A Distributed Self-learning Approach for Elastic Provisioning of Virtual Cloud Resources" (Jul. 25-27, 2011), IEEE 19$^{th}$ International MASCOTS Symposium, pp. 45-54 [retrieved from http://ieeexplore.ieee.org/xpls/abs_all.jsp?arnumber=6005367].*

Bobroff, N.; Kochut, A.; Beaty, K., "Dynamic Placement of Virtual Machines for Managing SLA Violations" (May 2007), 10$^{th}$ IFIP/IEEE International Symposium on Integrated Network Management, pp. 119-128 [retrieved from http://ieeexplore.ieee.org/stamp/stamp.jsp?tp=&arnumber=4258528].*

Chen, H.; Jin, H.; Hu, K.; Huang, J., "Dynamic Switching-Frequency Scaling: Scheduling Overcommitted Domains in Xen VMM," (Sep. 13-16, 2010), Proceedings of the 39th International Conference on Parallel Processing (ICPP), pp. 287-296 [retrieved from http://ieeexplore.ieee.org/stamp/stamp.jsp?tp=&arnumber=5599173].*

\* cited by examiner

MANAGING ALLOCATION OF HARDWARE RESOURCES IN A VIRTUALIZED ENVIRONMENT

BACKGROUND

Arrangements described herein relate to managing allocation of hardware resources in a virtualized environment.

Optimization of information technology (IT) resources is valuable to any organization using such resources, especially to organizations using data centers. A common approach to optimizing the use of IT resources is to reduce the total number of physical servers in a data center using server virtualization. With server virtualization, a plurality of operating systems can be simultaneously executed on a single physical server. These operating systems may be the same version, but this need not be the case. Indeed, completely different operating systems can be executed on the same physical server. In this regard, the virtualized operating systems can operate independently of one another, even though they are hosted on the same hardware. Implementing server virtualization reduces the total number of physical servers used in a data center, thus reducing the capital expenditures required to acquire the equipment, maintenance costs and energy consumption.

BRIEF SUMMARY

One or more embodiments disclosed within this specification relate to managing allocation of hardware resources in a virtualized environment.

An embodiment can include a method of managing allocation of hardware resources in a virtualized environment. The method can include receiving, via at least one processor external to a physical host that hosts a plurality of virtual machines, resource statistics pertaining to hardware resources of the physical host that are allocated to each of the plurality of virtual machines. The method also can include analyzing, external to the physical host and in real time, the resource statistics to determine whether allocation of the hardware resources to each of the plurality of virtual machines is optimized. The method further can include, when the allocation of the hardware resources to at least one of the virtual machines is not optimized, in real time, communicating at least one resource allocation message to the physical host, the resource allocation message indicating at least one hardware resource that is to be allocated to, or de-allocated from, the at least one virtual machine.

Another embodiment can include a system including at least one processor external to a physical host that hosts a plurality of virtual machines. The at least one processor is programmed to initiate executable operations. The executable operations can include receiving resource statistics pertaining to hardware resources of the physical host that are allocated to each of the plurality of virtual machines. The executable operations also can include analyzing, external to the physical host and in real time, the resource statistics to determine whether allocation of the hardware resources to each of the plurality of virtual machines is optimized. The executable operations further can include, when the allocation of the hardware resources to at least one of the virtual machines is not optimized, in real time, communicating at least one resource allocation message to the physical host, the resource allocation message indicating at least one hardware resource that is to be allocated to, or de-allocated from, the at least one virtual machine.

Another embodiment can include a computer program product for managing allocation of hardware resources in a virtualized environment, the computer program product including a computer readable storage medium having program code stored thereon. The program code is executable by at least one processor, external to a physical host that hosts a plurality of virtual machines, to perform a method. The method can include receiving, via the at least one processor external to the physical host that hosts the plurality of virtual machines, resource statistics pertaining to hardware resources of the physical host that are allocated to each of the plurality of virtual machines. The method also can include analyzing, via the at least one processor external to the physical host and in real time, the resource statistics to determine whether allocation of the hardware resources to each of the plurality of virtual machines is optimized. The method further can include, when the allocation of the hardware resources to at least one of the virtual machines is not optimized, via the at least one processor external to the physical host and in real time, communicating at least one resource allocation message to the physical host, the resource allocation message indicating at least one hardware resource that is to be allocated to, or de-allocated from, the at least one virtual machine.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to managing allocation of hardware resources in a virtualized environment. A physical host, such as a physical server or group of servers, can host a plurality of virtual machines. The physical host can be externally monitored by a resource allocation manager to determine whether allocation of hardware resources to each of the virtual machines (e.g., the virtual machines themselves and/or applications/software executed in the virtual machine environments) is optimized. When the resource allocation manager detects that the allocation of hardware resources is not optimized, the resource allocation manager can direct the physical host to allocate hardware resources to, and/or de-allocate hardware resources from, one or more of the virtual machines. Such monitoring and allocation/de-allocation can be a continuous process performed in real time, thus ensuring a very high degree of granularity of the process. As used herein, the term "real time" means a level of processing responsiveness that a user or system senses as sufficiently immediate for a particular process or determination to be made, or that enables the processor to keep up with some external process.

In illustration, an operating system can be implemented as a virtual machine (i.e., the operating system can be virtualized). When implemented as a virtual machine, the system architecture represented by, or used by, the operating system need not directly correspond to the total hardware resources of the physical host on which the operating system executes. Instead, a virtualized operating system need only use the hardware resources of the physical host allocated to the operating system, and need only represent those hardware resources when queried. In this regard, the hardware resources of the physical host can be virtualized, meaning that the actual physical characteristics of the hardware resources are not presented to the virtualized operating system. Instead, abstractions of the hardware resources are presented (e.g., a portion of available RAM, a portion of total available processors or processor cores, a portion of threads processed by a particular processor or processor core, etc.). Indeed, the abstraction of the hardware resources can be implemented so that a particular hardware resource mimics functionality of another hardware resource from the perspective of the virtualized operating system.

The determination of when to allocate/de-allocate hardware resources, for example virtualized hardware resources, can be based on resource statistics indicating actual hardware resource usage by each of the virtual machines, as well as virtual machine categories to which the respective virtual machines belong. With the allocation of hardware and/or virtual resources being continually optimized, optimal performance of the virtual machines executing on the physical host can be achieved, while mitigating allocation of hardware and/or virtual resources 114 to virtual machines that do not need such resources.

As used herein, the term "virtual machine" means a simulation of a machine (abstract or real) that is usually different from the target machine (where it is being simulated on). Virtual machines may be based on specifications of a hypothetical computer or emulate the computer architecture and functions of a real world computer. Typically this is implemented by executing the virtual machine over another software layer. In one example, a virtualized operating system can be executed over virtualization software that executes on a physical host in a software layer below the operating system. In another example, a first operating system itself can execute virtualization software, and thus provide the software layer for virtualization of another operating system, and the other operating system can be executed over that software layer. Virtual machines are not limited to operating systems, however. For example, a Java™ virtual machine is a virtual machine that can execute in an existing program, such as an existing operating system, or directly on hardware, and provide a runtime environment for applications configured to execute in the Java™ environment.

Figure 1:
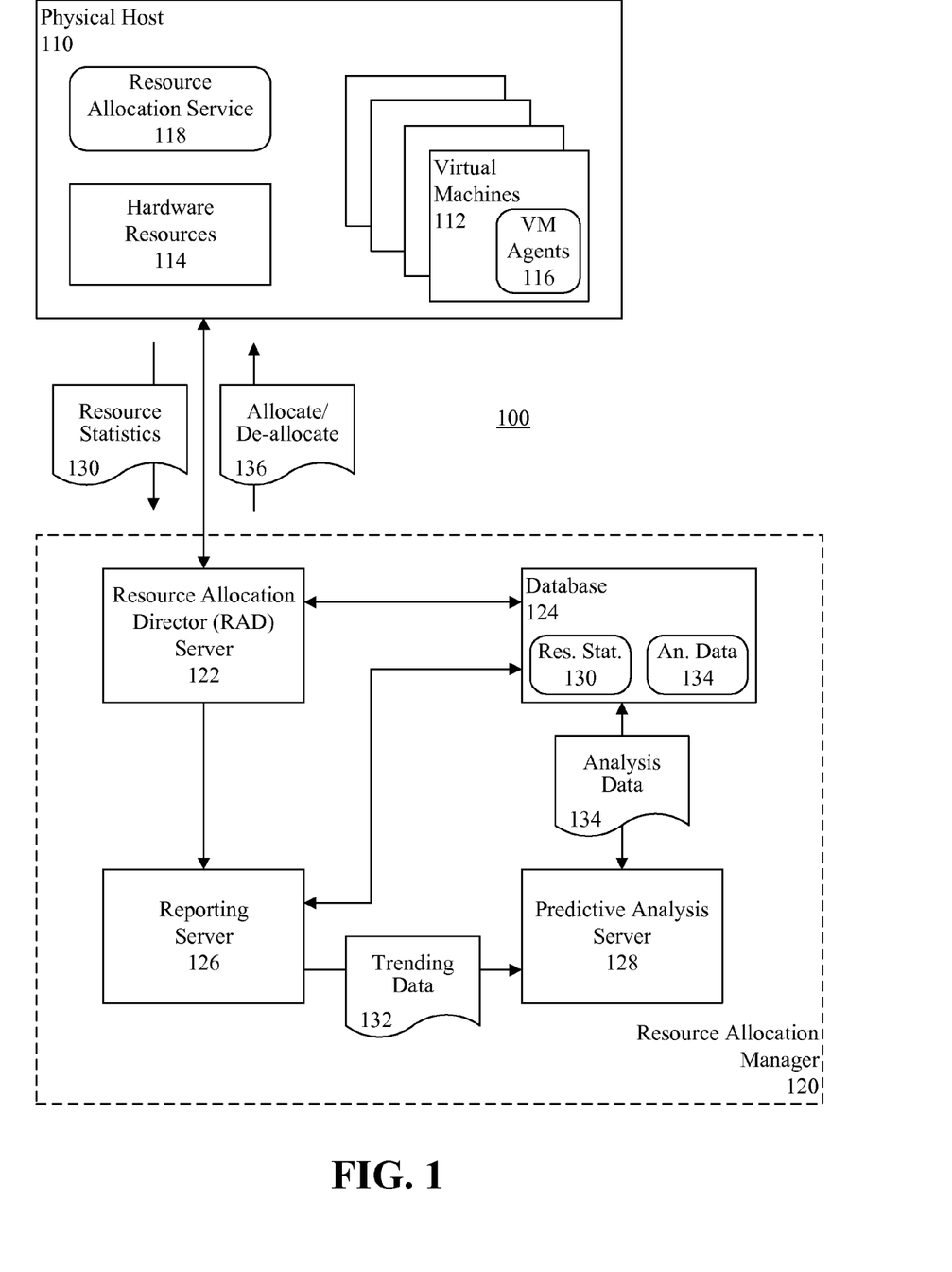
FIG. 1 is a block diagram illustrating a system for managing allocation of hardware resources in a virtualized environment in accordance with one embodiment disclosed within this specification.

FIG. 1 is a block diagram illustrating a system 100 for managing allocation of hardware resources in a virtualized environment in accordance with one embodiment disclosed within this specification. The system can include a physical host 110 that hosts a plurality of virtual machines 112. The virtual machines 112 can be virtual operating systems, for example virtual servers, or any other types of virtual machines.

The physical host 110 can comprise hardware resources 114 used to execute and support operation of the virtual machines 112. For example, the physical host 110 can comprise one or more processing systems, such as physical servers. Each physical server can comprise hardware resources 114. Examples of such hardware resources 114 include, but are not limited to, one or more processors, local memory, network adapters, etc. The physical host 110 also can include one or more bulk storage devices, which can be components of the servers or external to the servers. The bulk storage devices can be implemented as hard disk drives (HDDs), solid state drives (SSDs), raw disk mappings, or other persistent data storage devices.

Each processor can include one or more processing cores. Each processing core may be individually allocated and de-allocated among the virtual machines 112, and some processing cores can be allocated to different system layers. Thus, each processing core may be considered to be an individual hardware resource. Each processor also may be considered to be an individual hardware resource, in which case the entire processor can be allocated and/or de-allocated.

Local memory refers to RAM or other non-persistent memory device(s) generally used during actual execution of the program code. Local memory generally includes a large number of memory locations, each having a physical address. Groups of memory locations can be considered to be memory regions. Thus, local memory can include a plurality of memory regions (e.g., memory chunks). These memory regions can be allocated and de-allocated among the virtual machines 112, and some memory regions can be allocated to different system layers. In this regard, each portion of RAM that may be allocated/de-allocated is an individual hardware resource, regardless of whether such portions of RAM are contained in a single RAM module. Moreover, the portion of RAM that may be allocated/de-allocated, and thus considered to be an individual hardware resource, can be any desired amount of RAM. In this regard, the portions of RAM need not be pre-defined, but instead can be dynamically selected based on the requirements of the various virtual machines (e.g., the virtual machines themselves and/or software/applications executing in the virtual machine environments).

The bulk storage devices, or memory regions of the bulk storage devices, also can be allocated and de-allocated among the virtual machines 112, and some memory regions can be allocated to different system layers. In this regard, each portion of storage space in a bulk storage device that may be allocated/de-allocated is an individual hardware resource, regardless of whether such portions of storage space are contained in a single bulk storage device. Moreover, the portion of storage space that may be allocated/de-allocated, and thus considered to be an individual hardware resource, can be any desired amount of storage space and need not be pre-defined.

Network bandwidth provided by the network adapters also can be allocated/de-allocated among the virtual machines 112. For example, a particular network adapter may communicate via a network at a particular maximum data rate, or bandwidth. The total available bandwidth can be partitioned into portions of the available bandwidth, and these portions of bandwidth can be allocated to, or de-allocated from, the virtual machines 112. Each portion of bandwidth that may be allocated/de-allocated is an individual hardware resource. Further, portions of bandwidth from different network adapters allocated to a particular virtual machine 112 can be simultaneously utilized by the virtual machine 112 to realize a desired/required amount of network bandwidth.

A respective virtual machine agent (VM agent) 116 can execute in each of the virtual machines 112. Each VM agent 116 can be configured to monitor the usage of the hardware resources 114 (e.g., virtualized hardware resources) by the respective virtual machine 112 in which the VM agent 116 is executed and, in real time, generate corresponding resource statistics 130. As will be described, the resource statistics 130 can be processed to determine whether the allocation of hardware resources 114 to the respective virtual machine 112 is optimized.

A resource allocation service 118 can execute on the physical host 110, external to the virtual machines 112. For example the resource allocation service 118 can execute in a hardware control layer of a virtualization service/application or in another suitable layer. The resource allocation service 118 can be configured to allocate hardware resources 114 to, and de-allocate hardware resources from, the virtual machines 112 at the behest of a resource allocation manager 120.

The resource allocation manager 120 can be external to the physical host 110, and can be communicatively linked to the physical host 110 via one or more public and/or private communication networks. The communication network(s) can be implemented as, or include, any of a variety of different networks such as a WAN, a LAN, a wireless network, a mobile network, a Virtual Private Network (VPN), the Internet, the Public Switched Telephone Network (PSTN), or the like.

The resource allocation manager 120 can include a resource allocation director (RAD) server 122 configured to receive from each of the VM agents 116 the resource statistics 130 pertaining to hardware resources of the physical host 110 that are allocated to each of the respective virtual machines 112. The RAD server 122 can store the resource statistics 130 to a suitable database 124, in real time.

The resource allocation manager 120 also can include a reporting server 126. The reporting server 126 can access the resource statistics 130 from the database 124, in real time, as the resource statistics 130 are stored or updated. For example, the reporting server 126 can monitor the database 124 for updates and/or new records being created for the resource statistics 130, or the RAD server 122 can communicate a message to the reporting server 126 each time the RAD server 122 stores new resource statistics 130 to the database 124 or updates the resource statistics 130.

From the resource statistics 130, the reporting server 126 can identify trending data 132, and communicate the trending data 132 to a predictive analysis server 128. As used herein, the term "trending data" means data indicative of a trend. In this regard, the trending data 132 can comprise a portion of the resource statistics 130 that indicates trends relating to increased and/or decreased usage of the hardware resources 114 by the respective virtual machines 112. The trending data 132 can be reported to the predictive analysis server 128, in real time, as the trending data 132 is identified/detected by the reporting server 126.

The predictive analysis server 128 can analyze the trending data 132, in real time, to generate a prediction of near future hardware resource usage by each the virtual machines 112. In illustration, the predictive analysis server 128 can generate analysis data 134 corresponding to such predictions, and store the analysis data 134 to the database 124. As used herein the term "near future" means a future time that is very near, for example within the next 100 ms, 200 ms, 300 ms, 400 ms, 500 ms, 1 s, 2 s, 3 s, 4 s, 5 s, 10 s, 20 s, 30 s, 1 min, 2 min, 5 min, or any other time value less than 5 min.

The RAD server 122 can access the analysis data 134 from the database 124, in real time, as the analysis data 134 are stored or updated. For example, the RAD server 122 can monitor the database 124 for updates and/or new records being created for the analysis data 134, or the predictive analysis server 128 can communicate a message to the RAD server 122 each time the predictive analysis server 128 stores new analysis data 134 to the database 124 or updates the analysis data 134.

Based on the analysis data 134, the RAD server 122 can determine whether allocation of the hardware resources 114 to the respective virtual machines 112 is optimized for the predicted near future hardware resource usage of the virtual machines 112. If the allocation of the hardware resources 114 to the respective virtual machines 112 is not optimized, the RAD server 122 can communicate a resource allocation message 136 to the resource allocation service 118 indicating at least one hardware resource 114 to de-allocate from at least one virtual machine 112 and/or at least one hardware resource 114 to allocate to at least one virtual machine 112.

For example, if a particular virtual machine 112 is allocated 4 GB of RAM, and the analysis data 134 indicates that virtual machine will need something less than 2 GB of RAM in the near term, the RAD server 122 can indicate to the resource allocation service 118 to reduce the amount of RAM allocation to the virtual machine from 4 GB to 2 GB. The resource allocation service 118 can reduce the RAM allocation to the virtual machine 112 accordingly. The RAD server 122 can consider a margin, or headroom, in its determination. For example, the RAM allocation can be decreased to 2 G of RAM when the analysis data 134 shows that, in the near term, the virtual machine 112 actually only needs 1.8 GB of RAM, 1.7 GB of RAM, 1.6 GB of RAM, etc. When the analysis data 134 indicates that the virtual machine 112 is close to using the entire allocation of 2 GB RAM, the RAD server 122 can indicate to the resource allocation service 118 to allocate additional RAM to the virtual machine, for example to increase the total RAM allocation from 2 GB to 3 GB, 4 GB, or any other suitable amount. In this regard, each portion of RAM that may be allocated/de-allocated is an individual hardware resource (e.g., a virtualized hardware resource), regardless of whether such portions of RAM are contained in a single RAM module. Moreover, the portion of RAM that may be allocated/de-allocated, and thus considered to be an individual hardware resource, can be any desired amount of RAM.

In another example, the amount of RAM allocated to, and/or de-allocated from, a particular virtual machine 112 can based, at least in part, on the category of virtual machines the particular virtual machine 112 belongs. For instance, resource statistics 130 previously gathered for that particular virtual machine 112 and/or other virtual machines in the same category may indicate that the those virtual machines typically use a large amount of RAM (e.g., 4 GB) during certain conditions, but once those conditions subside, the virtual machines use less RAM (e.g., less than 2 GB). Accordingly, when the analysis data 134 indicates that such a condition soon will be encountered, or is being encountered, the RAD server 122 can, based on the previously gathered resource statistics, communicate a resource allocation message 136 to the resource allocation service 118 indicating to the resource allocation service 118 to allocate 4 GB of RAM to the virtual machine 112. When the analysis data 134 indicates that the condition has subsided, the RAD server 122 can, based on the previously gathered resource statistics, communicate a resource allocation message 136 to the resource allocation service 118 indicating to the resource allocation service 118 to de-allocate 2 GB of RAM from the virtual machine 112, thus leaving 2 GB of RAM still allocated to the virtual machine 112.

The foregoing examples discuss the allocation/de-allocation of RAM, but the present arrangements are not limited in this regard. Any other hardware resources 114, for example processors, processing cores, bulk storage, network bandwidth, etc., can be allocated and/or de-allocated to the virtual machines 112 in similar manners. In this regard, the granularity at which of hardware resource 114 allocation/de-allocation can be finely controlled. In other words, the frequency at which hardware resources 114 are allocated/de-allocated, and the amount of hardware resources 114 allocated/de-allocated, can be finely controlled to ensure that the hardware resources 114 are optimally allocated on a continuous basis. Thus, if a certain virtual machine 112 (e.g., the virtual machine itself and/or software/applications executing in the virtual machine environment) requires additional hardware resources 114, and another virtual machine 112 presently does not require all of the hardware resources 114 allocated to it, hardware resources 114 can very quickly be de-allocated from the other virtual machine 112 and re-allocated to the virtual machine 112 that requires the additional hardware resources. Moreover, if the frequency of allocation/de-allocation of hardware resources 114 to/from the virtual machine 112 is not optimized, for example to keep up with dynamic processes being implemented by the virtual machine 112 (e.g., the virtual machine itself and/or software/applications executing in the virtual machine environment), the frequency of such allocation/de-allocation can be increased. Indeed, the allocation/de-allocation can be implemented in real time as the needs of the virtual machine 112 are identified.

At this point it should be noted that the RAD server 122, database 124, reporting server 126 and predictive analysis server 128 can be implemented using suitable applications or other software. In this regard, the RAD server 122, database 124, reporting server 126 and predictive analysis server 128 can be executed on a single processing system, or among a plurality of processing systems that are communicatively linked. Moreover, the RAD server 122, database 124, reporting server 126 and predictive analysis server 128 can be virtualized, though this need not be the case.

Figure 2:
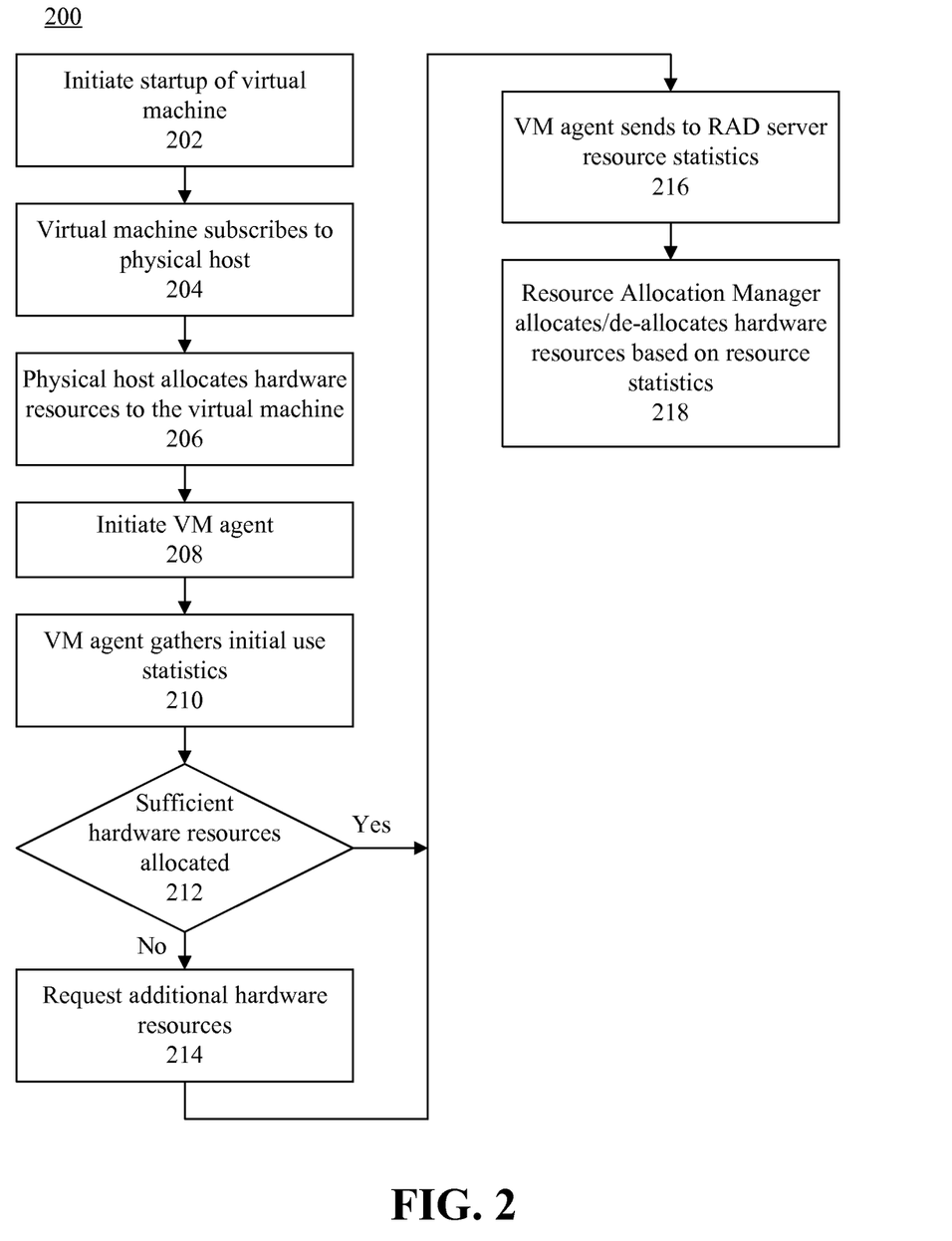
FIG. 2 is a flow chart illustrating a method of managing allocation of hardware resources in a virtualized environment in accordance with one embodiment disclosed within this specification.

FIG. 2 is a flow chart illustrating a method 200 of managing allocation of hardware resources in a virtualized environment in accordance with one embodiment disclosed within this specification. In this example, at step 202 startup (or boot) of a virtual machine 112 is initiated. At step 204 the virtual machine 112 can subscribe to the physical host 110. At step 206, the physical host 110 can allocate hardware resources 114 to the virtual machine 112. For example, the resource allocation service 118 can allocate the hardware resources 114 to the virtual machine 112.

At step 208, the VM agent 116 for the virtual machine 112 can be initiated, either during the startup process of the virtual machine 112 or after the virtual machine 112 is started. At step 210, the VM agent 116 can gather initial use statistics for the virtual machine 112. For example, the VM agent 116 can gather the initial use statistics from the virtual machine 112 itself, or request such statistics from the RAD server 122.

At decision box 212, the VM agent 116 can determine whether sufficient hardware resources 114 are allocated to the virtual machine 112 for initial execution of the virtual machine 112 (e.g., during startup of the virtual machine 112). If not, at step 214 the VM agent 116 can request from the resource allocation service 118 one or more additional hardware resources 114 desired/necessary to optimize performance of the virtual machine 112. In another arrangement, the VM agent 116 can send a message to the RAD server 122 indicating the desired/necessary hardware resource(s) 114, and the RAD server 122 can send to the resource allocation service 118 a resource allocation message 136 indicating to the resource allocation service 118 to allocate the desired/necessary hardware resource(s) 114 to the virtual machine 112 during startup of the virtual machine 112. In response, the resource allocation service 118 can allocate to the virtual machine 112 the desired/necessary hardware resource(s) 114.

At step 216, the VM agent 116 can send the resource statistics 130 to the RAD server 122, as previously described, for example when the startup of the virtual machine 112 is complete. At step 218, the resource allocation manager 120, via the RAD server 122, can initiate one or more resource allocation messages 136 to the resource allocation service 118 to allocate to, or de-allocate from, the virtual machine 112 one or more hardware resources 114 based on the resource statistics 130 and/or previously gathered resource statistics for the virtual machine 112 and/or other virtual machines in the same category as the virtual machine 112. Such allocation/de-allocation can be performed as previously described.

If more a plurality of virtual machines 112 are being started (and/or booted) simultaneously, the method 200 can be applied to each of the virtual machines 112 being started (and/or booted).

Figure 3:
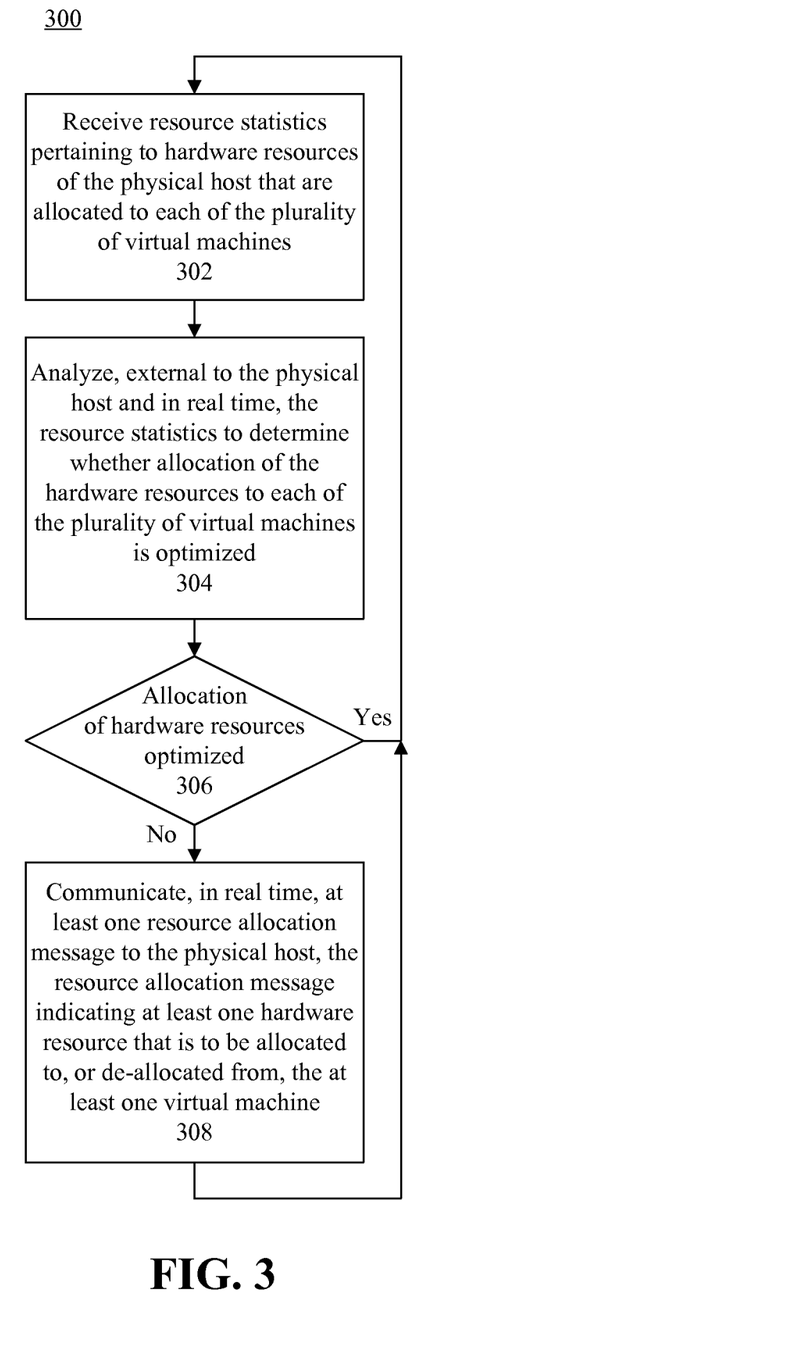
FIG. 3 is a flow chart illustrating another method of managing allocation of hardware resources in a virtualized environment in accordance with one embodiment disclosed within this specification.

FIG. 3 is a flow chart illustrating another method 300 of managing allocation of hardware resources in a virtualized environment in accordance with one embodiment disclosed within this specification. The method 300 can represent processes implemented by the resource allocation manager 120 at step 214 of FIG. 2. As noted, the resource allocation manager 120 can be external to the physical host 110.

At step 302, the resource allocation manager 120 (e.g., via the RAD server 122) can receive resource statistics 130 (e.g. from respective VM agents 116) pertaining to hardware resources 114 of the physical host 110 that are allocated to each of the plurality of virtual machines 112. At step 304, the resource allocation manager 120 (e.g., via the predictive analysis server 128) can, in real time, analyze the resource statistics 130 to determine whether allocation of the hardware resources 114 to each of the plurality of virtual machines 112 is optimized. In one arrangement, the determination can include determining whether the frequency at which the hardware resources are allocated to, or de-allocated from, each of the plurality of virtual machines is optimized.

At step 304, the resource allocation manager 120 (e.g., via the predictive analysis server 128) can analyze, external to the physical host and in real time, the resource statistics 130 to determine whether allocation of the hardware resources 114 to each of the plurality of virtual machines 112 is optimized. Referring to decision box 306 of the allocation of the hardware resources 114 is not optimized, at step 308 the resource allocation manager 120 (e.g., via the RAD server 122) can communicate in real time, at least one resource allocation message 136 to the physical host 110 (e.g., to the resource allocation service 118), the resource allocation message 136 indicating at least one hardware resource 114 that is to be allocated to, or de-allocated from, the at least one virtual machine 112. The process can proceed to step 302 and continue while the physical host 110 hosts one or more of the virtual machines 112.

Figure 4:
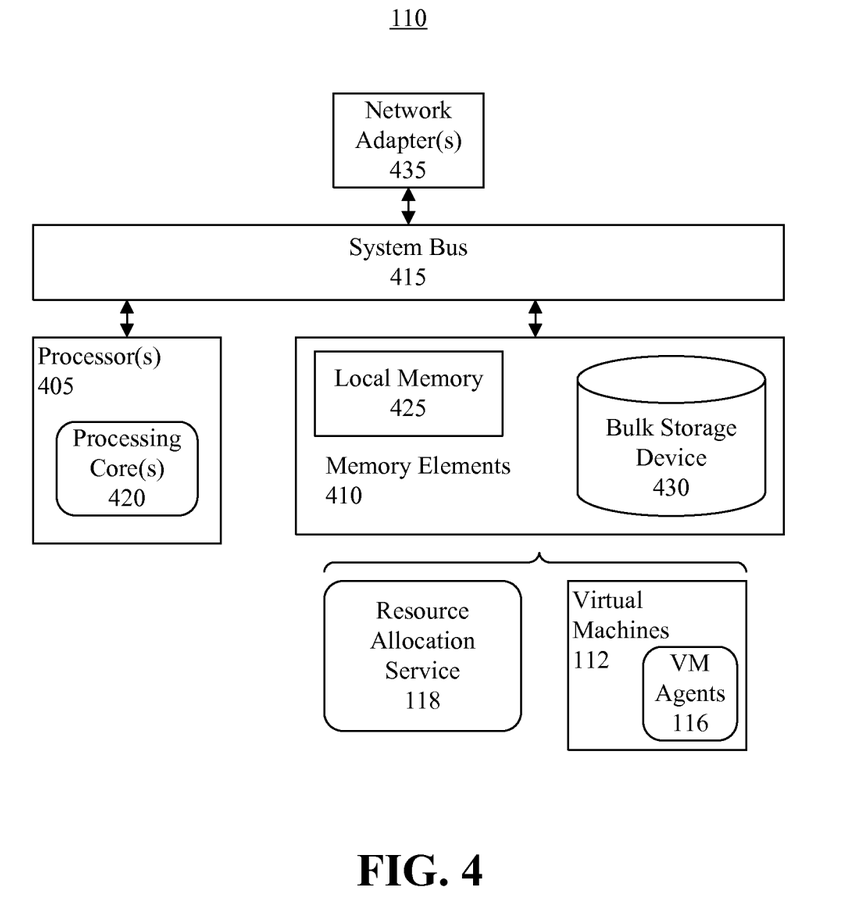
FIG. 4 is a block diagram illustrating an example of a physical host in accordance with one embodiment disclosed within this specification.

FIG. 4 is a block diagram illustrating an example of a physical host 110 in accordance with one embodiment disclosed within this specification. The physical host 110 can one or more processors 405 (e.g., central processing units) coupled to memory elements 410 through a system bus 415 or other suitable circuitry. As noted, each processor 405 can include one or more processing cores 420.

The memory elements 410 can include one or more physical memory devices such as, for example, local memory 425 and one or more bulk storage devices 430. The physical host 110 also can include one or more cache memories (not shown) that provide temporary storage of at least some program code in order to reduce the number of times program code must be retrieved from the bulk storage device 430 during execution.

Input/output (I/O) devices, such as one or more network adapters 435, can be provided by the physical host 110. The I/O devices can be coupled to other components of the physical host 110 either directly or through intervening I/O controllers. The network adapters 435 can enable physical host 110 to become coupled to other systems, computer systems, remote printers, and/or remote storage devices through intervening private or public networks. Ethernet cards, modems, cable modems and transceivers are examples of different types of network adapters 435 that can be used with physical host 110.

As pictured in FIG. 4, the memory elements 410 can store the components of the physical host 110, namely the resource allocation service 118 and the virtual machines 112. Moreover, various portions of the memory elements 410 can be allocated/de-allocated to the virtual machines 112 during operation of the virtual machines 112, as previously described. Being implemented in the form of executable program code, these components of the system 100 (FIG. 1) can be executed by the physical host 110. Moreover, the resource allocation service 118 is a functional data structure that imparts functionality when employed as part of the physical host 110, for example in a hardware control layer or virtualization layer of software executed on the physical host 110 to manage virtualization of the virtual machines 112. The virtual machines 112 and VM agents 116 also are functional data structures that impart functionality when executed by the physical host 110.

Figure 5:
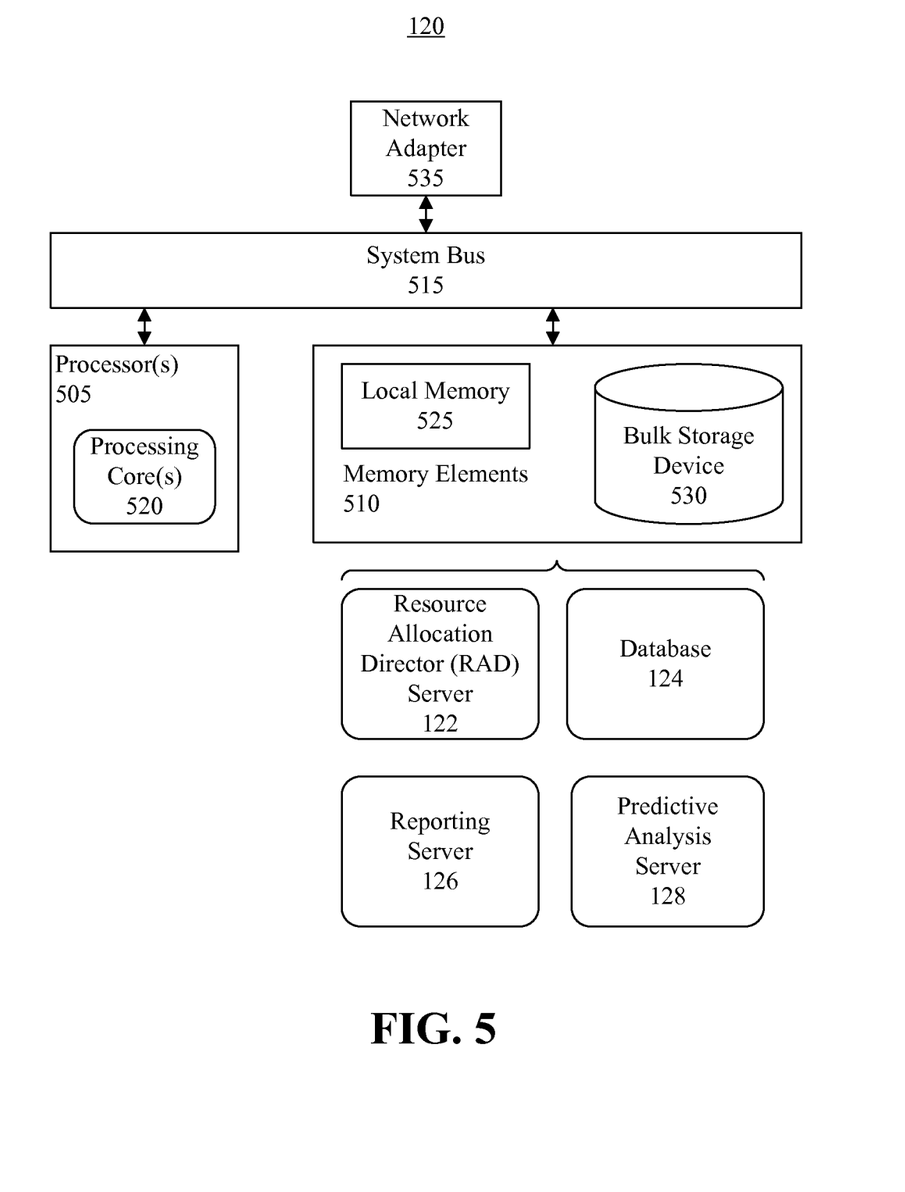
FIG. 5 is a block diagram illustrating an example of a resource allocation manager for managing allocation of hardware resources in a virtualized environment in accordance with one embodiment disclosed within this specification.

FIG. 5 is a block diagram illustrating an example of a resource allocation manager 120 for managing allocation of hardware resources in a virtualized environment in accordance with one embodiment disclosed within this specification. The resource allocation manager 120 can one or more processors 505 (e.g., central processing units) coupled to memory elements 510 through a system bus 515 or other suitable circuitry. As noted, each processor 505 can include one or more processing cores 520.

The memory elements 510 can include one or more physical memory devices such as, for example, local memory 525 and one or more bulk storage devices 530. The resource allocation manager 120 also can include one or more cache memories (not shown) that provide temporary storage of at least some program code in order to reduce the number of times program code must be retrieved from the bulk storage device 530 during execution.

Input/output (I/O) devices, such as one or more network adapters 535, can be provided by the resource allocation manager 120. The I/O devices can be coupled to other components of the resource allocation manager 120 either directly or through intervening I/O controllers. The network adapters 535 can enable the resource allocation manager 120 to become coupled to other systems, computer systems, remote printers, and/or remote storage devices through intervening private or public networks.

As pictured in FIG. 5, the memory elements 510 can store the components of the resource allocation manager 120, namely the RAD server 122, database 124, reporting server 126 and predictive analysis server 128. Being implemented in the form of executable program code, these components of the resource allocation manager 120 can be executed by the resource allocation manager 120. Moreover, the RAD server 122, database 124, reporting server 126 and predictive analysis server 128 are functional data structures that impart functionality when employed as part of and/or executed by the resource allocation manager 120. As noted, the resource allocation manager 120 can be implemented among a plurality of systems that are communicatively linked. Accordingly, the RAD server 122, database 124, reporting server 126 and predictive analysis server 128 can be store and/or executed among the plurality of different systems and/or processors that are communicatively linked.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of managing allocation of hardware resources in a virtualized environment, the method comprising:

receiving, via at least one processor external to a physical host that hosts a plurality of virtual machines, resource statistics pertaining to hardware resources of the physical host that are allocated to each of the plurality of virtual machines;

analyzing, external to the physical host and in real time, the resource statistics to determine whether allocation of the hardware resources to each of the plurality of virtual machines matches a desired allocation, analyzing the resource statistics comprising determining whether a frequency at which the hardware resources are de-allocated from at least a first of the plurality of virtual machines and allocated to at least a second of the plurality of virtual machines matches a desired allocation frequency; and responsive to the allocation of the hardware resources to at least one of the virtual machines not matching the desired allocation, communicating, in real time, at least one resource allocation message to the physical host, the resource allocation message indicating at least one hardware resource that is to be allocated to, or de-allocated from, the at least one virtual machine.

2. The method of claim 1, wherein receiving resource statistics pertaining to hardware resources of the physical host that are allocated to each of the plurality of virtual machines comprises:

receiving from each of a plurality of virtual machine agents, each of which is executed in a respective one of the virtual machines, respective resource statistics.

3. The method of claim 1, wherein communicating at least one resource allocation message to the physical host comprises:

communicating the at least one resource allocation message to a resource allocation service executing on the physical host.

4. The method of claim 1, wherein analyzing the resource statistics to determine whether allocation of the hardware resources to each of the plurality of virtual machines matches a desired allocation comprises:

identifying trending data in the resource statistics indicating a trend in actual resource usage by at least one of the plurality of virtual machines;

analyzing the trending data to generate a prediction of near future resource usage by the at least one of the plurality of virtual machines; and determining whether a frequency of allocation of hardware resources to the at least one of the plurality of virtual machines matches the desired allocation for the predicted near future resource usage.

5. The method of claim 1, wherein analyzing the resource statistics to determine whether allocation of the hardware resources to each of the plurality of virtual machines matches a desired allocation comprises:

identifying, for at least one of the plurality of virtual machines, a particular category of virtual machine to which the virtual machine belongs; and determining whether allocation of hardware resources to at least one of the plurality of virtual machines matches the desired allocation for the category of virtual machine to which the virtual machine belongs.

6. The method of claim 5, wherein determining whether allocation of hardware resources to the at least one of the plurality of virtual machines matches the desired allocation for the category of virtual machine to which the virtual machine belongs comprises:

analyzing resource statistics corresponding to other virtual machines that belong to the same category to which the at least one of the plurality of virtual machines belongs.

7. The method of claim 5, wherein:

the resource allocation message indicating at least one hardware resource that is to be allocated to, or de-allocated from, the at least one virtual machine indicates a plurality of hardware resources that are to be allocated to the at least one virtual machine during startup of the at least one virtual machine;

the method further comprising:

when startup of the at least one virtual machine is complete, communicating at least a second resource allocation message to the physical host, the second resource allocation message indicating at least one hardware resource that is to be de-allocated from the at least one virtual machine.

8. A system comprising:

at least one processor external to a physical host that hosts a plurality of virtual machines, the at least one processor programmed to initiate executable operations comprising:

receiving resource statistics pertaining to hardware resources of the physical host that are allocated to each of the plurality of virtual machines;

analyzing, external to the physical host and in real time, the resource statistics to determine whether allocation of the hardware resources to each of the plurality of virtual machines matches a desired allocation, analyzing the resource statistics comprising determining whether a frequency at which the hardware resources are de-allocated from at least a first of the plurality of virtual machines and allocated to at least a second of the plurality of virtual machines matches a desired allocation frequency; and responsive to the allocation of the hardware resources to at least one of the virtual machines not matching the desired allocation, communicating, in real time, at least one resource allocation message to the physical host, the resource allocation message indicating at least one hardware resource that is to be allocated to, or de-allocated from, the at least one virtual machine.

9. The system of claim 8, wherein receiving resource statistics pertaining to hardware resources of the physical host that are allocated to each of the plurality of virtual machines comprises:

receiving from each of a plurality of virtual machine agents, each of which is executed in a respective one of the virtual machines, respective resource statistics.

10. The system of claim 8, wherein communicating at least one resource allocation message to the physical host comprises:

communicating the at least one resource allocation message to a resource allocation service executing on the physical host.

11. The system of claim 8, wherein analyzing the resource statistics to determine whether allocation of the hardware resources to each of the plurality of virtual machines matches a desired allocation comprises:

identifying trending data in the resource statistics indicating a trend in actual resource usage by at least one of the plurality of virtual machines;

analyzing the trending data to generate a prediction of near future resource usage by the at least one of the plurality of virtual machines; and determining whether a frequency of allocation of hardware resources to the at least one of the plurality of virtual machines matches the desired allocation for the predicted near future resource usage.

12. The system of claim 8, wherein analyzing the resource statistics to determine whether allocation of the hardware resources to each of the plurality of virtual machines matches a desired allocation comprises:
    identifying, for at least one of the plurality of virtual machines, a particular category of virtual machine to which the virtual machine belongs; and
    determining whether allocation of hardware resources to at least one of the plurality of virtual machines matches the desired allocation for the category of virtual machine to which the virtual machine belongs.

13. The system of claim 12, wherein determining whether allocation of hardware resources to the at least one of the plurality of virtual machines matches the desired allocation for the category of virtual machine to which the virtual machine belongs comprises:
    analyzing resource statistics corresponding to other virtual machines that belong to the same category to which the at least one of the plurality of virtual machines belongs.

14. The system of claim 12, wherein:
    the resource allocation message indicating at least one hardware resource that is to be allocated to, or de-allocated from, the at least one virtual machine indicates at least one hardware resource that is to be allocated to the at least one virtual machine during startup of the at least one virtual machine;
    the method further comprising:
        when startup of the at least one virtual machine is complete, communicating at least a second resource allocation message to the physical host, the second resource allocation message indicating at least one hardware resource that is to be de-allocated from the at least one virtual machine.

15. A computer program product for managing allocation of hardware resources in a virtualized environment, the computer program product comprising a computer readable storage medium having program code stored thereon, the program code executable by at least one processor, external to a physical host that hosts a plurality of virtual machines, to perform a method comprising:
    receiving, via the at least one processor external to the physical host that hosts the plurality of virtual machines, resource statistics pertaining to hardware resources of the physical host that are allocated to each of the plurality of virtual machines;
    analyzing, external to the physical host and in real time, the resource statistics to determine whether allocation of the hardware resources to each of the plurality of virtual machines matches a desired allocation, analyzing the resource statistics comprising determining whether a frequency at which the hardware resources are de-allocated from at least a first of the plurality of virtual machines and allocated to at least a second of the plurality of virtual machines matches a desired allocation frequency; and
    responsive to the allocation of the hardware resources to at least one of the virtual machines not matching the desired allocation, communicating, in real time, at least one resource allocation message to the physical host, the resource allocation message indicating at least one hardware resource that is to be allocated to, or de-allocated from, the at least one virtual machine.

16. The computer program product of claim 15, wherein analyzing the resource statistics to determine whether allocation of the hardware resources to each of the plurality of virtual machines matches a desired allocation comprises:
    identifying trending data in the resource statistics indicating a trend in actual resource usage by at least one of the plurality of virtual machines;
    analyzing the trending data to generate a prediction of near future resource usage by the at least one of the plurality of virtual machines; and
    determining whether a frequency of allocation of hardware resources to the at least one of the plurality of virtual machines matches the desired allocation for the predicted near future resource usage.

17. The computer program product of claim 15, wherein analyzing the resource statistics to determine whether allocation of the hardware resources to each of the plurality of virtual machines matches a desired allocation comprises:
    identifying, for at least one of the plurality of virtual machines, a particular category of virtual machine to which the virtual machine belongs; and
    determining whether allocation of hardware resources to at least one of the plurality of virtual machines matches the desired allocation for the category of virtual machine to which the virtual machine belongs.

18. The computer program product of claim 17, wherein determining whether allocation of hardware resources to the at least one of the plurality of virtual machines matches the desired allocation for the category of virtual machine to which the virtual machine belongs comprises:
    analyzing resource statistics corresponding to other virtual machines that belong to the same category to which the at least one of the plurality of virtual machines belongs.

19. The computer program product of claim 17, wherein:
    the resource allocation message indicating at least one hardware resource that is to be allocated to, or de-allocated from, the at least one virtual machine indicates a plurality of hardware resources that are to be allocated to the at least one virtual machine during startup of the at least one virtual machine;
    the method further comprising:
        when startup of the at least one virtual machine is complete, communicating at least a second resource allocation message to the physical host, the second resource allocation message indicating at least one hardware resource that is to be de-allocated from the at least one virtual machine.

20. The computer program product of claim 15, wherein communicating at least one resource allocation message to the physical host comprises:
    communicating the at least one resource allocation message to a resource allocation service executing on the physical host.

* * * * *